(12) United States Patent
Kwak et al.

(10) Patent No.: US 7,995,458 B2
(45) Date of Patent: Aug. 9, 2011

(54) METHOD AND APPARATUS FOR TRANSMITTING/RECEIVING PILOT SIGNAL IN A WIRELESS COMMUNICATION SYSTEM

(75) Inventors: Yong-Jun Kwak, Yongin-si (KR); Joon-Young Cho, Suwon-si (KR); Soeng-Hun Kim, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 652 days.

(21) Appl. No.: 12/120,750

(22) Filed: May 15, 2008

(65) Prior Publication Data

US 2008/0285529 A1 Nov. 20, 2008

(30) Foreign Application Priority Data

May 16, 2007 (KR) .................. 10-2007-0047853

(51) Int. Cl.
*H04J 11/00* (2006.01)
*H04J 3/06* (2006.01)
*H04B 7/185* (2006.01)
*H04W 4/00* (2009.01)
(52) U.S. Cl. .................. 370/208; 370/324; 370/503
(58) Field of Classification Search .................. 370/208, 370/319, 324, 338, 344, 503
See application file for complete search history.

(56) References Cited

U.S. PATENT DOCUMENTS

| | | | | |
|---|---|---|---|---|
| 6,804,214 B1* | 10/2004 | Lundh et al. | .................. | 370/335 |
| 7,561,543 B2* | 7/2009 | Zalio | .................. | 370/328 |
| 7,738,437 B2* | 6/2010 | Ma et al. | .................. | 370/342 |
| 7,860,132 B2* | 12/2010 | Sriram | .................. | 370/510 |
| 2001/0048711 A1* | 12/2001 | Sun et al. | .................. | 375/145 |
| 2002/0118705 A1* | 8/2002 | Sezgin et al. | .................. | 370/503 |
| 2005/0099939 A1* | 5/2005 | Huh et al. | .................. | 370/210 |
| 2005/0157637 A1 | 7/2005 | Feng et al. | | |
| 2006/0114942 A1* | 6/2006 | Jang | .................. | 370/503 |
| 2007/0041348 A1 | 2/2007 | Kwun et al. | | |
| 2007/0098050 A1 | 5/2007 | Khandekar et al. | | |
| 2007/0160118 A1* | 7/2007 | Charbit | .................. | 375/145 |
| 2008/0181195 A1* | 7/2008 | Cho et al. | .................. | 370/350 |
| 2009/0061864 A1* | 3/2009 | Sohn | .................. | 455/434 |
| 2009/0080372 A1* | 3/2009 | Naka et al. | .................. | 370/328 |
| 2009/0116459 A1* | 5/2009 | Do | .................. | 370/336 |
| 2009/0219883 A1* | 9/2009 | Cho et al. | .................. | 370/330 |
| 2009/0268602 A1* | 10/2009 | Han et al. | .................. | 370/208 |

(Continued)

FOREIGN PATENT DOCUMENTS

WO WO 2007/029958 3/2007

*Primary Examiner* — Chi H Pham
*Assistant Examiner* — Farah Faroul
(74) *Attorney, Agent, or Firm* — The Farrell Law Firm, P.C.

(57) ABSTRACT

A method and apparatus for transmitting a pilot signal in a wireless communication system. A reference cell scrambling code or one of a plurality of additional cell scrambling codes is selected for each combination of one of a plurality of first scrambling codes (PSCs) applied to a first synchronization channel (P-SCH) and one of a plurality of second scrambling codes (SSCs) applied to a second synchronization channel (S-SCH). It is determined whether to transmit the pilot signal using the reference cell scrambling code or one of the plurality of additional cell scrambling codes. The reference cell scrambling code or the additional cell scrambling code is generated according to the determination. The pilot signal is transmitted using the generated reference cell scrambling code or the additional cell scrambling code.

15 Claims, 9 Drawing Sheets

U.S. PATENT DOCUMENTS

2009/0323642 A1* 12/2009 Tanno et al. .................. 370/336
2010/0014660 A1* 1/2010 Kishiyama et al. ............. 380/31
2010/0232397 A1* 9/2010 Hu et al. ....................... 370/336
2010/0309900 A1* 12/2010 Li et al. ........................ 370/342
2011/0044256 A1* 2/2011 Chang et al. .................. 370/329

* cited by examiner

METHOD AND APPARATUS FOR TRANSMITTING/RECEIVING PILOT SIGNAL IN A WIRELESS COMMUNICATION SYSTEM

PRIORITY

This application claims priority under 35 U.S.C. §119(a) to a Korean Patent Application filed in the Korean Intellectual Property Office on May 16, 2007 and assigned Serial No. 2007-47853, the disclosure of which is incorporated herein by reference.

BACKGROUND OF THE INVENTION

1. Field of the Invention

The present invention relates generally to a cellular wireless communication system, and more particularly, to a method and apparatus for transmitting/receiving pilot signals.

2. Description of the Related Art

In cellular wireless communication systems, for demodulation of received data and control information, synchronization and cell search should first be achieved between a transmitter and a receiver. The downlink synchronization and cell search process refers to a process of determining a frame start point of physical channels transmitted in a cell to which a User Equipment (UE) belongs, and detecting a cell-specific scrambling code applied during transmission of the physical channels. This process is referred to herein as a 'cell search process'. The cell search process is achieved by detecting a code of a downlink Synchronization Channel (SCH) by a UE.

Figure 1:
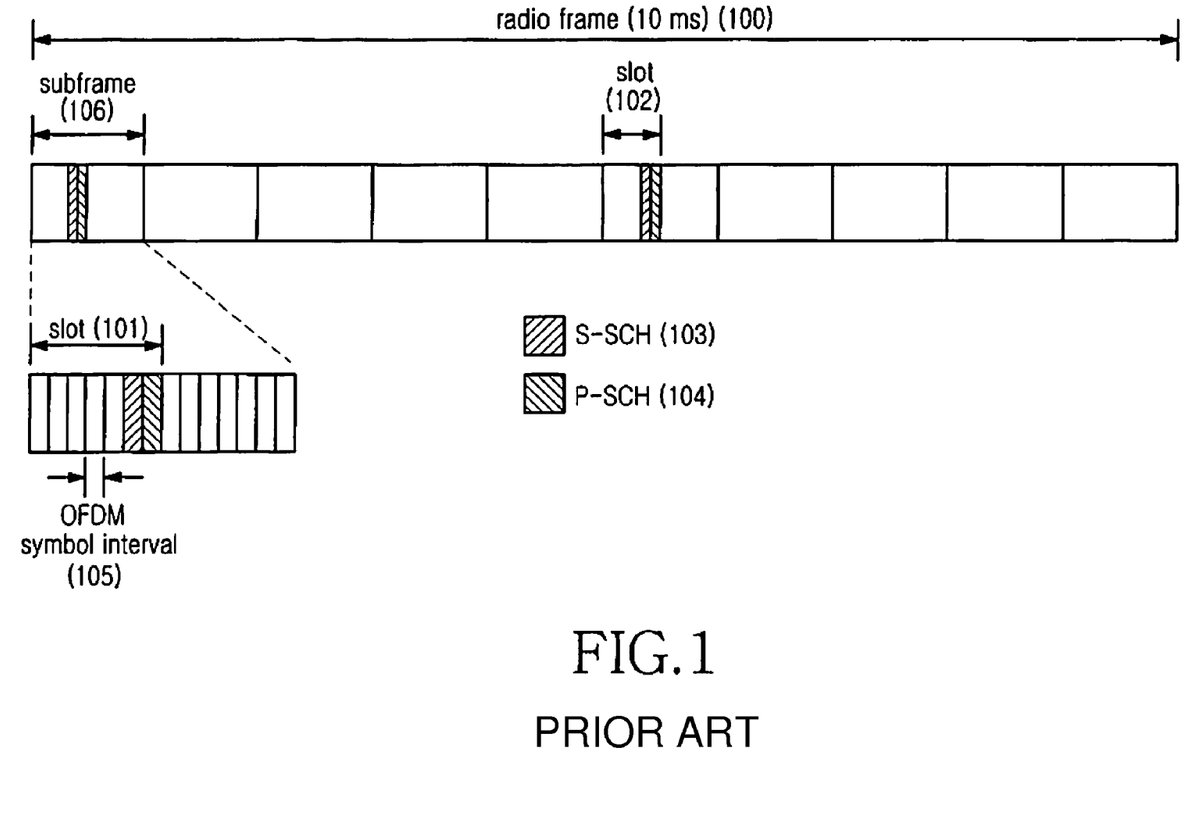
FIG. 1 is a diagram illustrating a downlink frame structure and a mapping relation between synchronization channels.

FIG. 1 illustrates an Orthogonal Frequency Division Multiplexing (OFDM)-based downlink frame structure and a transmission point of a synchronization channel for Enhanced Universal Terrestrial Radio Access (EUTRA) which is the next generation mobile communication standard of the $3^{rd}$ Generation Partnership Project (3GPP).

As illustrated in FIG. 1, a 10-ms radio frame 100 is composed of 10 subframes, and each subframe 106 is composed of two slots 101, 102. Generally, seven OFDM symbols 105 are transmitted in one slot. In the downlink, a Primary Synchronization Channel (P-SCH) 104 and a Secondary Synchronization Channel (S-SCH) 103 are transmitted in slots 101, 102 defined in each subframe 106.

In the EUTRA system, a UE acquires slot timing synchronization from the P-SCH in a first step of cell search. The slot timing synchronization acquisition process is achieved by calculating, by a UE, a correlation between a scrambling code applied to the P-SCH (P-SCH Scrambling Code; hereinafter referred to as 'PSC') and a received signal, and searching for a time where a high correlation is generated. There are three PSC codes used for P-SCH, and one cell transmits the P-SCH using one of the three PSC codes.

In a second step, the UE checks, from the S-SCH, frame timing synchronization and a cell code group including a cell-specific scrambling code applied to the corresponding cell. This is achieved by detecting a scrambling code applied to the S-SCH (S-SCH Scrambling Code; hereinafter referred to as SSC). In this case, as shown in FIG. 1, P-SCH 104 and S-SCH 103 are transmitted through adjacent OFDM symbols in one slot. Therefore, the UE performs synchronization detection (or coherent detection) for removing an influence of channels on S-SCH signals, by using the P-SCH detected in the first step of cell search as a channel estimation pilot for S-SCH detection. The interference-removed S-SCH signals are then detected, making it possible to improve S-SCH detection performance. There are 170 SSC codes used for the S-SCH, and one cell transmits the S-SCH using one of the 170 SSC codes.

One cell transmits the P-SCH using one of the three PSCs, and transmits the S-SCH using one of the 170 SSCs. Therefore, it is possible to find a cell Identifier (ID) with a combination (or set) of the PSC and SSC codes. That is, a UE selects one of 170 cell group IDs depending on a received S-SCH transmitted by the corresponding cell, and selects a cell ID belonging to the cell group ID from the P-SCH received in advance of the S-SCH, thereby determining which cell ID among a total of 510 cell IDs the Node B has. The cell selects one of the 510 cell IDs, and scrambles a downlink pilot channel (or reference signal) using one predetermined cell scrambling code mapped to the selected ID. Therefore, in the final step, the UE selects one scrambling code mapped to the decided cell ID, and descrambles a received pilot channel with it to determine whether the pilot signal has been normally received. That is, based on whether the pilot signal has been normally received or not, the UE determines whether the decision on a cell ID has been made correctly through the cell search process.

The cell search process of a UE has been described above. The number of cell IDs that the UE can select in the cell search process is limited to 510. While the number of Node Bs from which one UE can receive cell IDs is limited, the 510 cell IDs are enough for one UE. However, Home Node B has recently been considered a kind of the cell. The Home Node B, a small-sized Node B, can be arbitrarily installed in a place desired by a user. Therefore, in the possible situation where the 510 cell IDs are not enough due to the use of Home Node Bs, the UE may have difficulty in distinguishing Node Bs, causing communication problems.

SUMMARY OF THE INVENTION

The present invention has been made to address at least the above problems and/or disadvantages and to provide at least the advantages described below. Accordingly, an aspect of the present invention provides an excellent cell search method and apparatus designed in consideration of use of Home Node Bs in a wireless communication system.

Another aspect of the present invention provides a method and apparatus for transmitting/receiving pilots using a plurality of scrambling codes mapped to arbitrary PSC and SSC.

According to one aspect of the present invention, a method for transmitting a pilot signal in a wireless communication system is provided. A reference cell scrambling code or one of a plurality of additional cell scrambling codes is selected for each combination of one of a plurality of first scrambling codes (PSCs) applied to a first synchronization channel (P-SCH) and one of a plurality of second scrambling codes (SSCs) applied to a second synchronization channel (S-SCH). It is determined whether to transmit the pilot signal using the reference cell scrambling code or one of the plurality of additional cell scrambling codes. The reference cell scrambling code or the additional cell scrambling code is generated according to the determination. The pilot signal is transmitted using one of the generated reference cell scrambling code and additional cell scrambling code.

According to another aspect of the present invention, a method for receiving a pilot signal in a wireless communication system is provided. The method includes acquiring a plurality of first scrambling codes (PSCs) applied to a first synchronization channel (P-SCH) and a plurality of second scrambling codes (SSCs) applied to a second synchronization channel (S-SCH) from the first synchronization channel signal and the second synchronization channel signal, respectively. One of a plurality of cell scrambling codes mapped to each combination of one of the first scrambling codes and one of the second scrambling codes is generated as a reference cell scrambling code, and a pilot signal is received using the generated reference cell scrambling code. A cell Identifier (ID) is determined from the reference cell scrambling code when the pilot signal has been successfully received. When the pilot signal has not been successfully received, one of the plurality of cell scrambling codes except for the reference cell scrambling code is generated as an additional cell scrambling code, the pilot signal is received using the generated additional cell scrambling code, and a cell ID is determined from the additional cell scrambling code.

According to a further aspect of the present invention, an apparatus is provided for transmitting a pilot signal in a wireless communication system. The apparatus includes a cell scrambling code generator for generating, as a reference cell scrambling code, one of a plurality cell scrambling codes for each combination of one of a plurality of first scrambling codes (PSCs) applied to a first synchronization channel (P-SCH) and one of a plurality of second scrambling codes (SSCs) applied to a second synchronization channel (S-SCH). The cell scrambling code generator also generates, as additional cell scrambling codes, the remaining cell scrambling codes except for the reference cell scrambling code. The apparatus also includes a cell scrambling code set selection unit for selecting the reference cell scrambling code or one additional cell scrambling code among the generated cell scrambling codes, and a transmission unit for masking the selected one cell scrambling code in the pilot channel, and transmitting the pilot channel.

According to yet another aspect of the present invention, an apparatus is provided for receiving a pilot signal in a wireless communication system. The apparatus includes a reception unit for receiving a first synchronization channel (P-SCH) signal, a second synchronization channel (S-SCH) signal and a pilot channel signal. The apparatus also includes a synchronization signal decision unit for acquiring a plurality of first scrambling codes (PSCs) applied to the first synchronization channel and a plurality of second scrambling codes (SSCs) applied to the second synchronization channel from the first synchronization channel signal and the second synchronization channel signal, respectively. A cell scrambling code generator generates, as a reference cell scrambling code, one of a plurality of cell scrambling codes mapped to each combination of one of the first scrambling codes and one of the second scrambling codes, and generates, as additional cell scrambling codes, the remaining cell scrambling codes except for the reference cell scrambling code. A pilot decision unit masks the generated reference cell scrambling code or one of the additional cell scrambling codes to the pilot channel signal, to determine whether the pilot channel signal has been successfully received.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention. Terms used herein are defined based on functions in the present invention and may vary according to users, operators' intention or usual practices. Therefore, the definition of the terms should be made based on contents throughout the specification.

Although embodiments of the present invention will be described herein in detail with reference to the 3GPP EUTRA (Enhanced-UMTS or Long Term Evolution (LTE)) standard, by way of example, it will be understood by those skilled in the art that the present invention can be applied to other communication systems having similar technical background and channel format with slight modification without departing from the spirit and scope of the invention.

The present invention presents a possibility that one of 510 combinations of PSCs and SSCs can use more than one cell scrambling code without limiting the number of cell IDs to 510. 510 cell scrambling codes are used based on the 510 combinations of PSCs and SSCs transmitted through synchronization channels in determining a cell ID based on a synchronization channel in the downlink of a wireless communication system, thereby making it possible to expand the number of cell IDs to a number greater than 510. When one cell scrambling code is applied for each of multiple combinations of PSCs and SSCs as described above, it causes a lack of cell IDs when Home Node Bs are used or when multiple cells are assigned to one Node B on a concentrated basis.

The present invention allows an individual Node B to use multiple cell scrambling codes for each combination of PSC and SSC, rather than allowing all Node Bs to use only one cell scrambling code for an arbitrary combination of PSC and SSC. That is, the present invention allows for a possibility to use different cell scrambling codes even for the same combination of PSC and SSC according to the characteristic of a Node B, the setup of a network, or the setup of a work place. In this case, the present invention defines one reference cell scrambling code for each combination of PSC and SSC individually, and in most cases, allows use of the reference cell scrambling codes. When a UE selects PSC and SSC through cell search and receives a pilot signal, it generally checks the pilot signal using multiple cell scrambling codes if possible. In this case, the present invention can allow the UE to check the pilot signal by preferentially using the defined reference cell scrambling codes, thereby making it possible to maximally reduce the cell search time.

With reference to the accompanying drawings, a detailed description will now be made of a cell search method according to an embodiment of the present invention.

Figure 2:
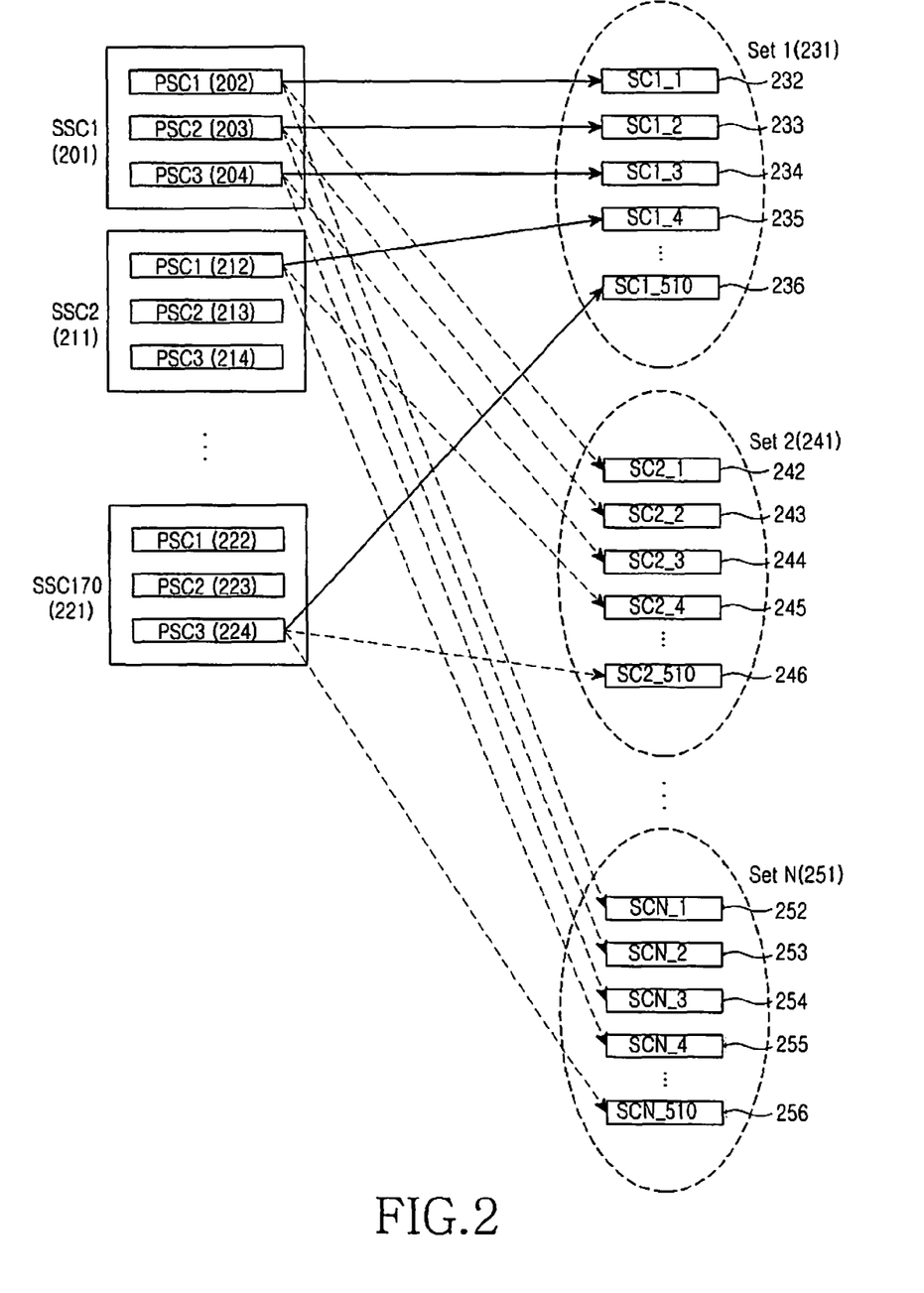
FIG. 2 is a diagram illustrating a mapping relation between combinations of PSCs and SSCs and their associated cell scrambling codes according to an embodiment of the present invention.

FIG. 2 illustrates a mapping relation between combinations of PSCs and SSCs and their associated cell scrambling codes according to an embodiment of the present invention.

Referring to FIG. 2, one of 170 SSCs forms one code group and three PSCs exist in the code group, resulting in a total of 510 cell IDs that can be used. SSC1 201, SSC2 211, ..., SSC170 221 of FIG. 2 show code groups of 170 SSCs, and a code group SSC1 201 can be mapped to 3 PSCs 202, 203 and 204. The three combinations SSC1-PSC1, SSC1-PSC2, and SSC1-PSC3 are mapped to reference cell scrambling codes SC1_1 232 through SC1_3 234 belonging to a scrambling code set #1 231, each forming a cell ID. However, if the cell, unlike the normal cell, is a Home Node B, the combinations may be mapped to other scrambling codes rather than being mapped to the reference cell scrambling codes, so that the cell may have another cell ID. That is, the combinations between SSC1 201 and PSC1 202, PSC2 203 and PSC3 204 can use cell scrambling codes SC2_1 242 through SC2_3 244 belonging to a scrambling code set #2 241, and can also use cell scrambling codes SCN_1 252 through SCN_3 254 belonging to a scrambling code set #N 251 (where N is a natural number greater than 2). Determining to which one of (N*510) cell scrambling codes each combination of SSC and PSC is mapped can be made according to the characteristic of a Node B, the setup of a network, or the setup of a work place.

Therefore, in deciding the cell scrambling code used for a pilot signal after receiving the PSC and SSC during cell search, a UE preferentially determines receipt/non-receipt of the pilot signal using the reference cell scrambling codes 232 through 234 included in the cell scrambling code set #1 231, and if the receipt of the pilot signal is uncertain, determines receipt/non-receipt of the pilot signal using cell scrambling codes included in another cell scrambling code set in arbitrary order.

A detailed description will now be made of examples of the technology presented by the present invention.

A first embodiment of the present invention considers multiple cell scrambling codes mapped to an arbitrary PSC-SSC combination, and presents a method for generating the multiple cell scrambling codes by means of different scrambling code generators, respectively. Although a description of the first embodiment of the present invention will be given on the assumption that the system uses a reference cell scrambling code set and an additional cell scrambling code set as its cell scrambling code sets, the present invention is not limited to the number of cell scrambling code sets, and can also be applied to other systems that use more than two cell scrambling code sets.

Figure 3:
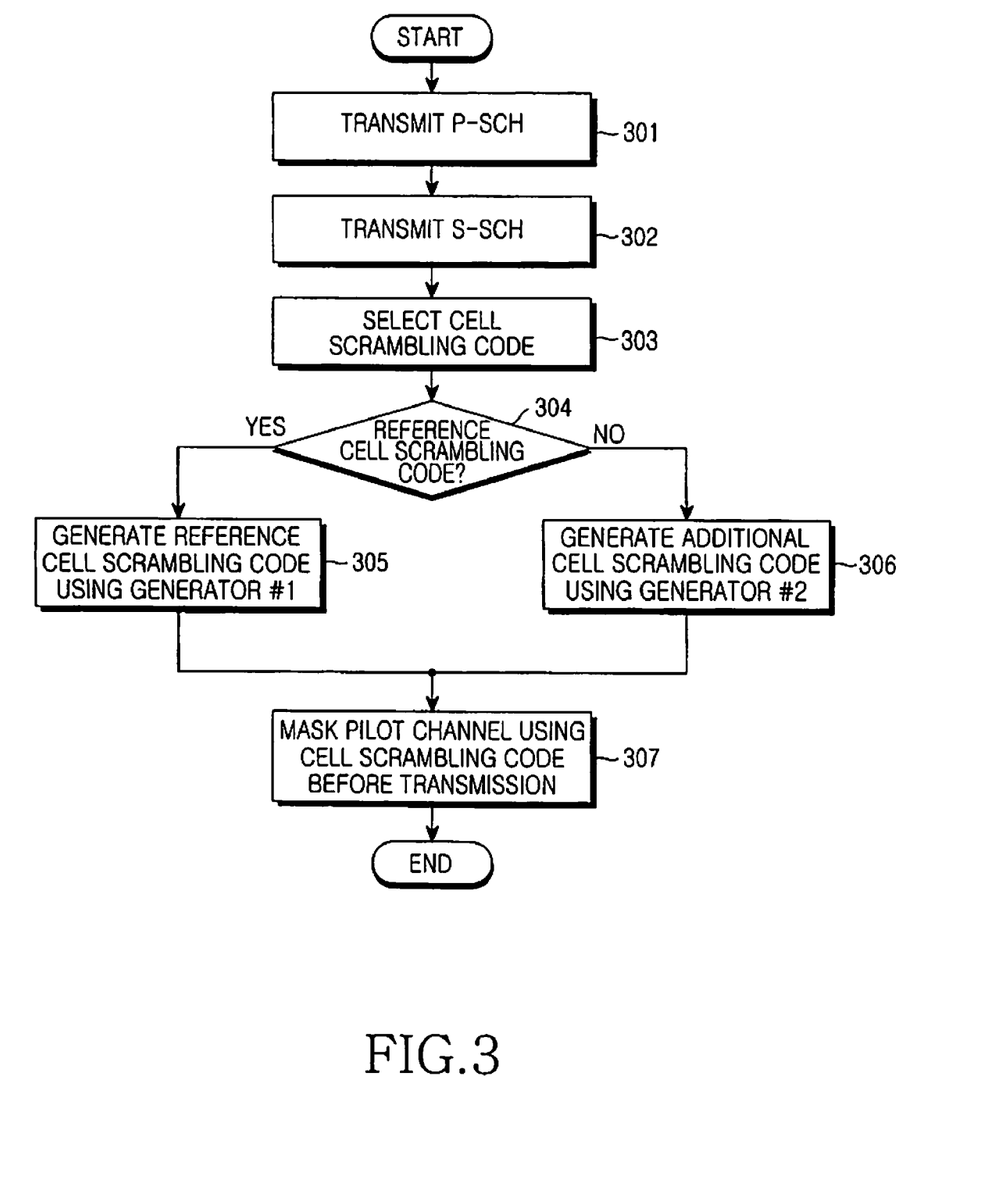
FIG. 3 is a diagram illustrating a transmission operation of a Node B according to a first embodiment of the present invention.

FIG. 3 illustrates a transmission operation of a Node B according to the first embodiment of the present invention.

Referring to FIG. 3, a Node B transmits a P-SCH with a PSC in step 301, and transmits an S-SCH with an SSC in step 302. In this case, one of 3 available PSC codes is used as the PSC, and one of 170 available SSC codes is used as the SSC. The Node B selects a cell scrambling code in step 303. In this case, a normal Node B uses a reference cell scrambling code, while a Home Node B uses an additional cell scrambling code, or can determine a cell scrambling code to use, according to the setup of a network or the setup of a work place. The Node B determines in step 304 whether the selected cell scrambling code is a reference cell scrambling code. If the selected cell scrambling code is a reference cell scrambling code, the Node B generates a reference cell scrambling code by means of a cell scrambling code generator #1 in step 305. That is, the cell scrambling code generator #1 generates a reference cell scrambling code mapped to the combination of the PSC and SSC transmitted in steps 301 and 302. However, if the selected cell scrambling code is not a reference cell scrambling code, the Node B generates additional cell scrambling code by means of a cell scrambling code generator #2 in step 306. That is, the cell scrambling code generator #2 generates an additional cell scrambling code mapped to the combination of the PSC and SSC transmitted in steps 301 and 302. When the generation of a cell scrambling code is completed in step 305 or 306, the Node B masks a pilot channel using the generated cell scrambling code before transmission in step 307. In this way, in the first embodiment of the present invention, since the cell scrambling code generator #1 and the cell scrambling code generator #2 are different in structure, the Node B should include both of the two generators.

Figure 4:
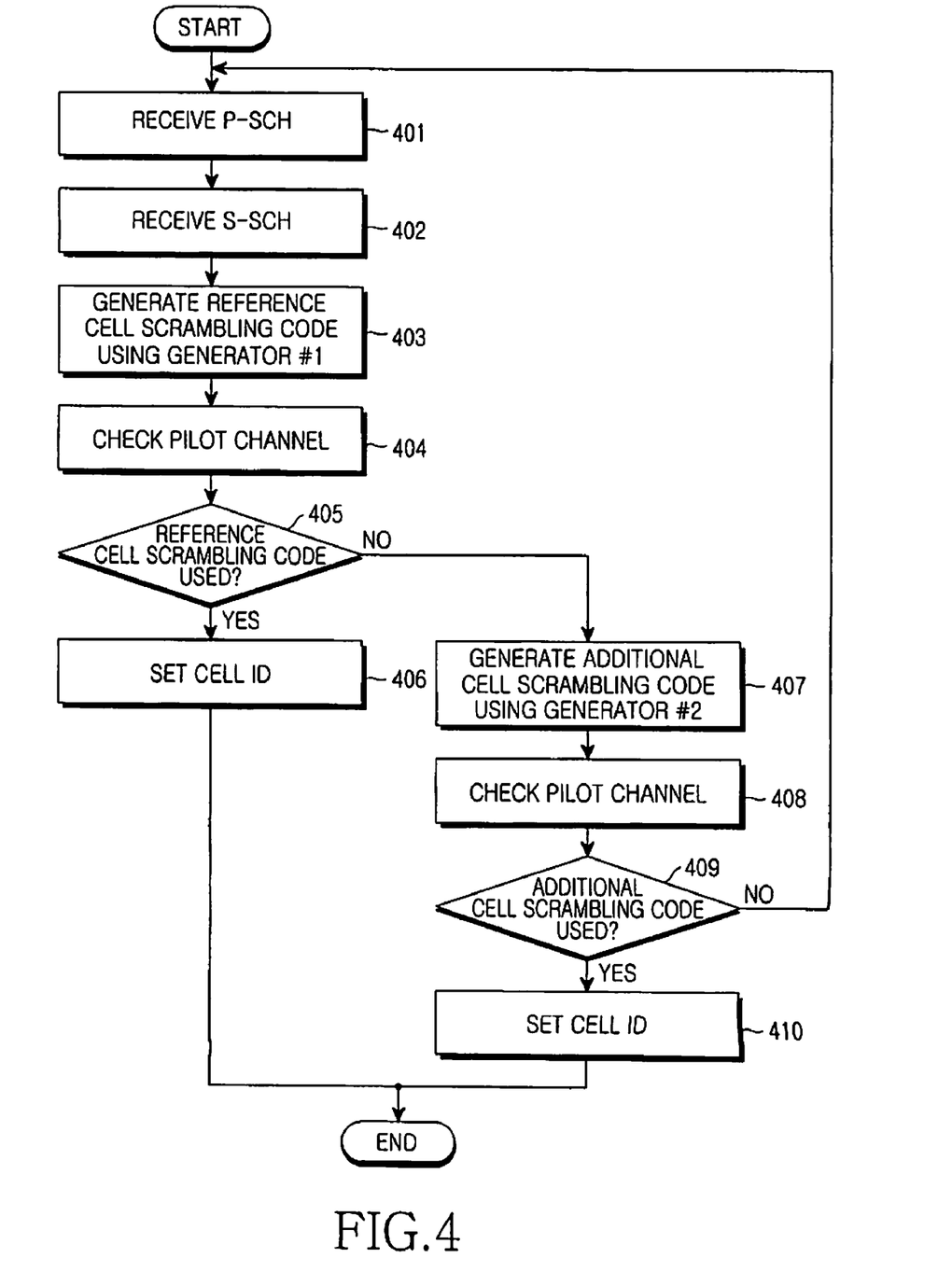
FIG. 4 is a diagram illustrating a reception operation of a UE according to the first embodiment of the present invention.

FIG. 4 illustrates a reception operation of a UE according to the first embodiment of the present invention.

Referring to FIG. 4, a UE receives the P-SCH to determine the PSC in step 401, and receives the S-SCH to determine the SSC in step 402. Thereafter, the UE generates a reference cell scrambling code mapped to a combination of the PSC and SSC by means of a cell scrambling code generator #1 in step 403, and checks a pilot channel using the generated reference cell scrambling code in step 404. If it is determined in step 405 that a Node B that transmitted a pilot signal has used a reference cell scrambling code for the pilot channel as it has normally received the pilot channel, the UE sets a cell ID obtained by combining the PSC, SSC and reference cell scrambling code in step 406. However, if it is determined that the generated reference cell scrambling code has not been used, the UE generates again an additional cell scrambling code by means of a cell scrambling code generator #2 in step 407, and checks a pilot channel using the generated additional cell scrambling code in step 408. If it is determined in step 409 that the Node B that transmitted the pilot signal has used an additional cell scrambling code for the pilot channel as it has normally received the pilot channel, the UE sets a cell ID obtained by combining the PSC, SSC and additional cell scrambling code in step 410. If it is determined in step 409 that the Node B that transmitted the pilot signal has not used an additional cell scrambling code for the pilot channel, the methodology returns to step 401.

Figure 5:
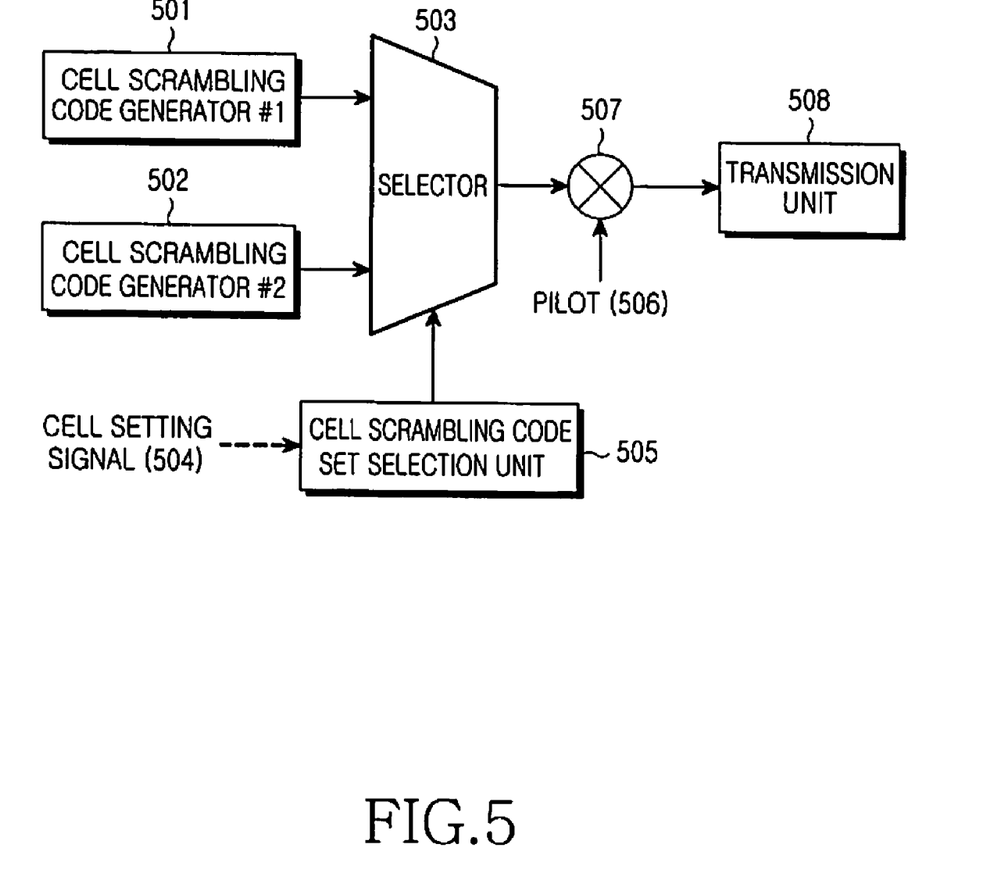
FIG. 5 is a diagram illustrating a structure of a Node B transmitter according to the first embodiment of the present invention.

FIG. 5 illustrates a structure of a Node B transmitter according to the first embodiment of the present invention.

Referring to FIG. 5, a Node B includes two cell scrambling code generators 501 and 502, a selector 503, a cell scrambling code set selection unit 505, a multiplier 507, and a transmission unit 508. When cell setting signal 504 is input to the cell scrambling code set selection unit 505, the cell scrambling code set selection unit 505 controls the selector 503 so as to determine (selects) which of the reference cell scrambling code and additional cell scrambling code generated by the two cell scrambling code generators 501 and 502 it will use. The cell scrambling code selected by the selector 503 is masked in a pilot signal 506 by the multiplier 507, and then transmitted on a pilot channel by means of the transmission unit 508.

Figure 6:
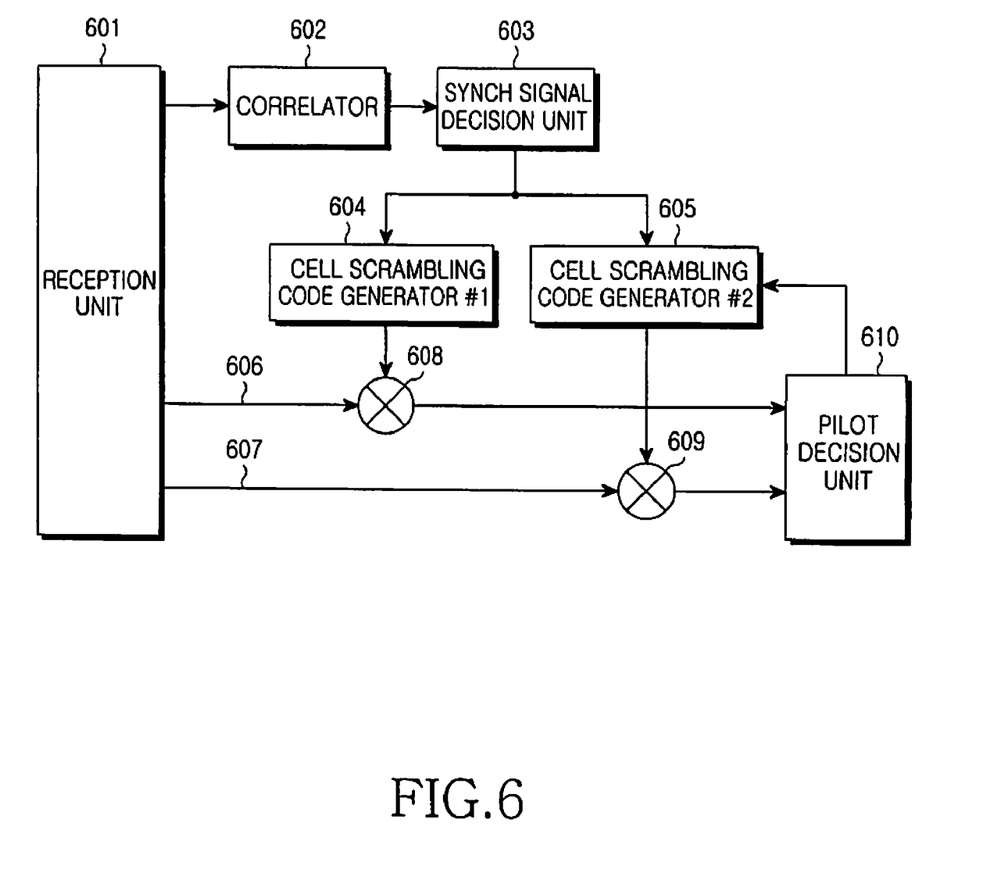
FIG. 6 is a diagram illustrating a structure of a UE receiver according to the first embodiment of the present invention.

FIG. 6 illustrates a structure of a UE receiver according to the first embodiment of the present invention.

Referring to FIG. 6, a UE includes a reception unit 601, a correlator 602, a synchronization signal decision unit 603, two cell scrambling code generators 604 and 605, multipliers 608 and 609, and a pilot decision unit 610. After receiving a radio signal by means of the reception unit 601, the UE determines the P-SCH and S-SCH using the correlator 602. Thereafter, the synchronization signal decision unit 603 detects PSC and SSC from the P-SCH and S-SCH found by the correlator 602, and the cell scrambling code generator #1 604 generates a reference cell scrambling code mapped to the PSC-SSC combination. A pilot signal 606 received by way of the reception unit 601 is masked with the reference cell scrambling code by means of the multiplier 608, and then transferred to the pilot decision unit 610, and the pilot decision unit 610 determines whether the pilot signal has been normally received.

When the pilot signal has not been normally received, the cell scrambling code generator #2 605 generates again an additional cell scrambling code mapped to the PSC-SSC combination. A pilot signal 607 received by way of the reception unit 601 is masked with the additional cell scrambling code by means of the multiplier 609, and then transferred to the pilot decision unit 610, and the pilot decision unit 610 determines whether the pilot signal has been normally received.

A second embodiment of the present invention considers multiple cell scrambling codes mapped to an arbitrary PSC-SSC combination, and presents a method for generating the multiple cell scrambling codes by means of one same scrambling code generator. Although the second embodiment of the present invention will be described herein on the assumption that the system uses a reference cell scrambling code set and an additional cell scrambling code set as its cell scrambling code set, the present invention is not limited by the number of cell scrambling code sets, and can also be applied to other systems that use more than two cell scrambling code sets.

Figure 7:
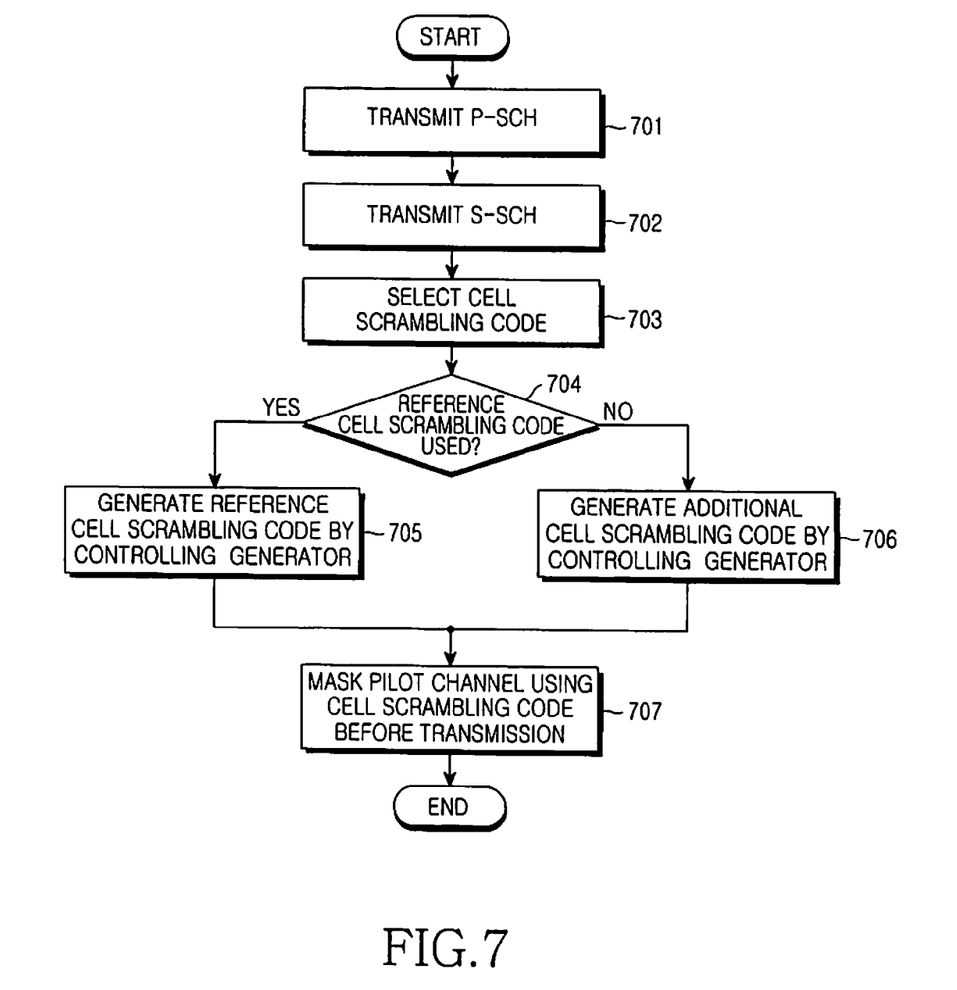
FIG. 7 is a diagram illustrating a transmission operation of a Node B according to a second embodiment of the present invention.

FIG. 7 illustrates a transmission operation of a Node B according to the second embodiment of the present invention.

Referring to FIG. 7, a Node B transmits P-SCH with PSC in step 701, and transmits an S-SCH with an SSC in step 702. In this case, one of 3 available PSC codes is used as the PSC, and one of 170 available SSC codes is used as the SSC. The Node B selects a cell scrambling code in step 703. In this case, a normal Node B uses a reference cell scrambling code, while a Home Node B uses an additional cell scrambling code, or can determine a cell scrambling code to use, according to the setup of a network or the setup of a work place. The Node B determines in step 704 whether the selected cell scrambling code is a reference cell scrambling code. If the selected cell scrambling code is a reference cell scrambling code, the Node B generates a reference cell scrambling code by means of a cell scrambling code generator in step 705. That is, the cell scrambling code generator generates a reference cell scrambling code mapped to a combination of the PSC and SSC transmitted in steps 701 and 702. However, if the selected cell scrambling code is not a reference cell scrambling code, the Node B generates an additional cell scrambling code by means of the cell scrambling code generator in step 706. That is, the cell scrambling code generator generates an additional cell scrambling code mapped to the combination of the PSC and SSC transmitted in steps 701 and 702. When the generation of the cell scrambling code is completed in step 705 or 706, the Node B masks a pilot channel using the generated cell scrambling code before transmission in step 707. In this way, since the second embodiment of the present invention can generate the reference scrambling code and the additional scrambling code using one common cell scrambling code generator, the Node B needs to include only one cell scrambling code generator.

Figure 8:
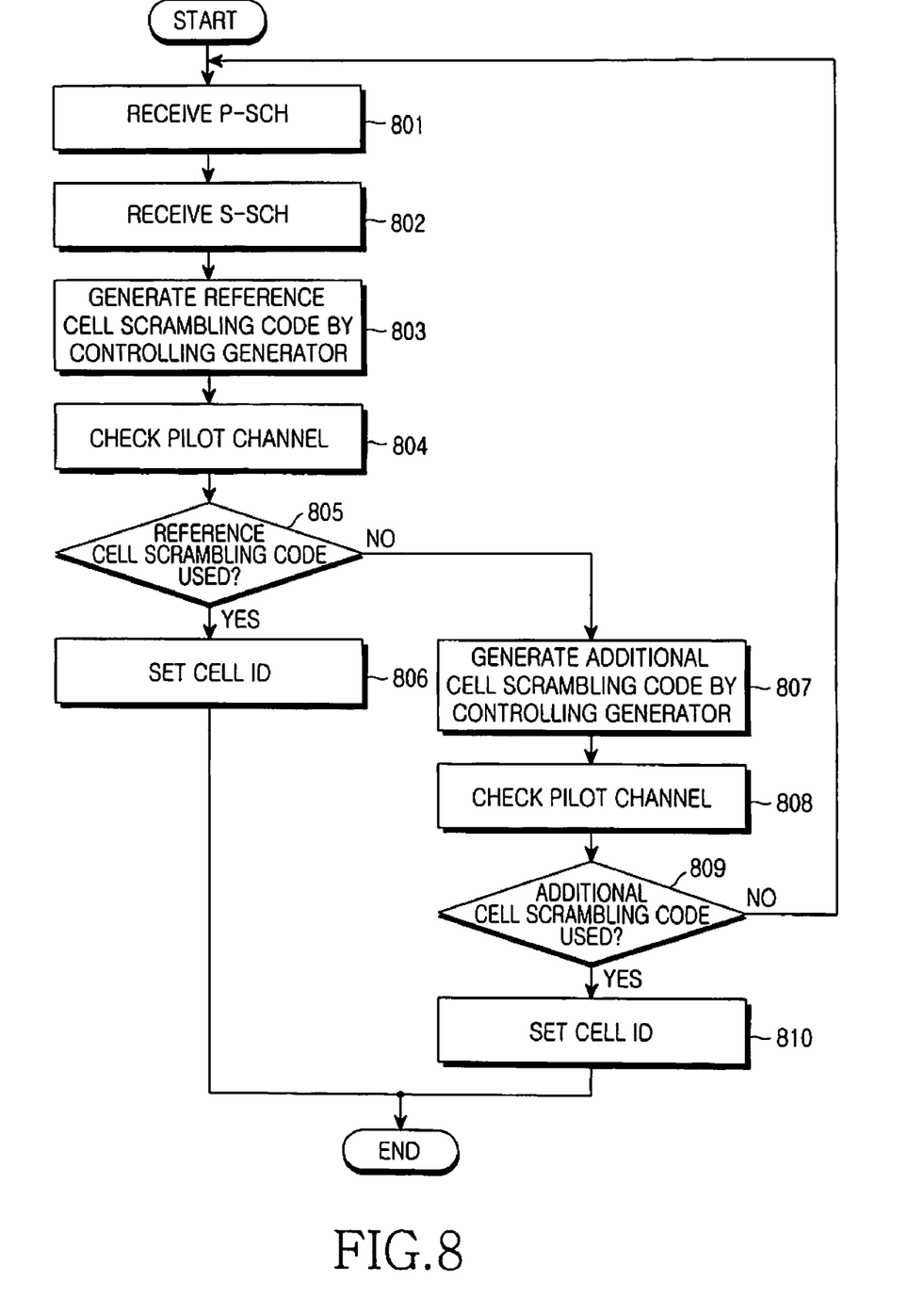
FIG. 8 is a diagram illustrating a reception operation of a UE according to the second embodiment of the present invention.

FIG. 8 illustrates a reception operation of a UE according to the second embodiment of the present invention.

Referring to FIG. 8, a UE receives the P-SCH to determine the PSC in step 801, and receives the S-SCH to determine the SSC in step 802. Thereafter, the UE generates a reference cell scrambling code mapped to a combination of the PSC and SSC using a cell scrambling code generator in step 803, and checks a pilot channel using the generated reference cell scrambling code in step 804. If it is determined in step 805 that a Node B that transmitted a pilot signal has used a reference cell scrambling code for the pilot channel as it has normally received the pilot signal, the UE sets a cell ID obtained by combining the PSC, SSC and reference cell scrambling code in step 806. However, if it is determined that the generated reference cell scrambling code has not been used, the UE generates again an additional cell scrambling code being different from the reference cell scrambling code by means of the cell scrambling code generator in step 807, and checks a pilot channel using the generated additional cell scrambling code in step 808. If it is determined in step 809 that the Node B that transmitted the pilot signal has used an additional cell scrambling code for the pilot channel as it has normally received the pilot signal, the UE sets a cell ID obtained by combining the PSC, SSC and additional cell scrambling code in step 810. If it is determined in step 809 that the Node B that transmitted the pilot signal has not used an additional cell scrambling code for the pilot channel, the methodology returns to step 801.

Figure 9:
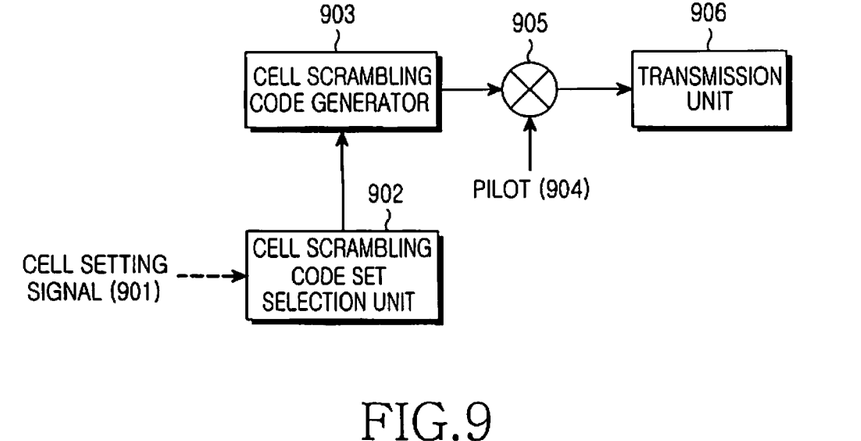
FIG. 9 is a diagram illustrating a structure of a Node B transmitter according to the second embodiment of the present invention.

FIG. 9 illustrates a structure of a Node B transmitter according to the second embodiment of the present invention.

Referring to FIG. 9, a Node B includes one cell scrambling code generator 903, a cell scrambling code set selection unit 902, a multiplier 905, and a transmission unit 906. When a cell setting signal 901 is input to the cell scrambling code set selection unit 902, the cell scrambling code set selection unit 902 controls the cell scrambling code generator 903 so as to generate a reference cell scrambling code or an additional cell scrambling code. The reference cell scrambling code or additional cell scrambling code generated in the cell scrambling code generator 903 is masked in a pilot channel 904 by the multiplier 905, and then transmitted on a pilot channel by means of the transmission unit 906.

Figure 10:
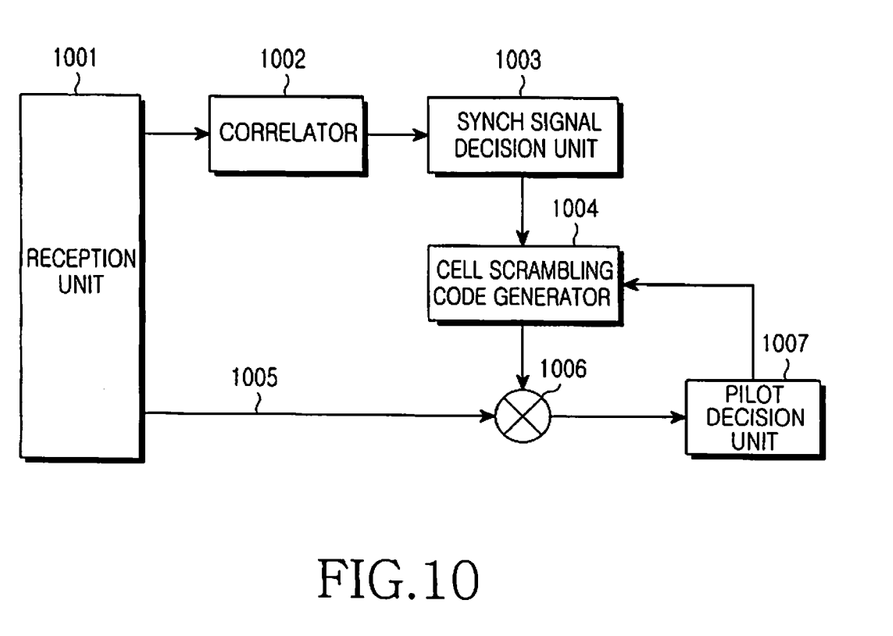
FIG. 10 is a diagram illustrating a structure of a UE receiver according to the second embodiment of the present invention.

FIG. 10 illustrates a structure of a UE receiver according to the second embodiment of the present invention.

Referring to FIG. 10, a UE includes a reception unit 1001, a correlator 1002, a synchronization signal decision unit 1003, a cell scrambling code generator 1004, a multiplier 1006, and a pilot decision unit 1007. After receiving a radio signal by way of the reception unit 1001, the UE determines the P-SCH and S-SCH using the correlator 1002. Thereafter, the synchronization signal decision unit 1003 detects the PSC and SSC from the P-SCH and S-SCH found by the correlator 1002, and the cell scrambling code generator 1004 generates a reference cell scrambling code mapped to a combination of the PSC and SSC. A pilot signal 1005 received by way of the reception unit 1001 is masked with the reference cell scrambling code by means of the multiplier 1006, and then transferred to the pilot decision unit 1007, and the pilot decision unit 1007 determines whether the pilot signal has been normally received.

When the pilot signal has not been normally received, the cell scrambling code generator 1004 generates again an additional cell scrambling code mapped to a combination of the PSC and SSC. Also, the pilot signal 1005 received by way of the reception unit 1001 is masked with the additional cell scrambling code by means of the multiplier 1006, and then transferred to the pilot decision unit 1007, and the pilot decision unit 1007 determines whether the pilot signal has been normally received.

As is apparent from the foregoing description, the present invention introduces additional scrambling codes while maintaining the reference scrambling codes, which are basically applied to all cells in the system, thereby ensuring higher flexibility in cell search of the Node B.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a pilot signal in a wireless communication system, the method comprising the steps of:
   selecting a reference cell scrambling code and one of a plurality of additional cell scrambling codes for each combination of one of a plurality of first scrambling codes applied to a first synchronization channel and one of a plurality of second scrambling codes applied to a second synchronization channel;
   determining whether to transmit the pilot signal using the reference cell scrambling code or one of the plurality of additional cell scrambling codes;
   generating the reference cell scrambling code or the additional cell scrambling code according to the determination; and
   transmitting the pilot signal using one of the generated reference cell scrambling code and the additional cell scrambling code.

2. The method of claim 1, wherein selecting a reference cell scrambling code comprises:
   selecting a cell scrambling code as the reference cell scrambling code, wherein the second scrambling codes each form at least one code group and the cell scrambling codes exist in each of the code groups, and a number of cell scrambling codes is equal to the number of combinations of the first scrambling codes and the second scrambling codes.

3. The method of claim 1, wherein, in the step of generating the cell scrambling code, the reference cell scrambling code and the additional cell scrambling code are generated by means of different cell scrambling code generators, respectively.

4. A method for receiving a pilot signal in a wireless communication system, the method comprising the steps of:
   acquiring a plurality of first scrambling codes applied to a first synchronization channel and a plurality of second scrambling codes applied to a second synchronization channel from the first synchronization channel signal and the second synchronization channel signal, respectively;
   generating, as a reference cell scrambling code, one of a plurality of cell scrambling codes each mapped to a combination of one of the plurality of first scrambling codes and one of the plurality of second scrambling codes, and receiving a pilot signal using the generated reference cell scrambling code;
   determining a cell Identifier (ID) from the reference cell scrambling code when the pilot signal has been successfully received; and
   when the pilot signal has not been successfully received, generating, as an additional cell scrambling code, one of the plurality of cell scrambling codes except for the reference cell scrambling code, receiving the pilot signal using the generated additional cell scrambling code, and determining a cell ID from the additional cell scrambling code.

5. The method of claim 4, wherein, in the step of generating one of the plurality cell scrambling codes as a reference cell scrambling code, the second scrambling codes each form at least one code group and the cell scrambling codes exist in each of the code groups, and the number of cell scrambling codes is equal to the number of combinations of the first scrambling codes and the second scrambling codes.

6. The method of claim 5, wherein the reference cell scrambling code and the additional cell scrambling code are generated by means of different cell scrambling code generators, respectively.

7. The method of claim 4, wherein determining a cell ID from the additional cell scrambling code comprises:
   sequentially generating a plurality of additional cell scrambling codes except for the reference cell scrambling code until the pilot signal is successfully received, and receiving the pilot signal using the generated additional cell scrambling code.

8. An apparatus for transmitting a pilot signal in a wireless communication system, the apparatus comprising:
   a cell scrambling code generator for generating, as a reference cell scrambling code, one of a plurality of cell scrambling codes for each combination of one of a plurality of first scrambling codes applied to a first synchronization channel and one of a plurality of second scrambling codes applied to a second synchronization channel, and generating, as additional cell scrambling codes, the remaining cell scrambling codes except for the reference cell scrambling code;
   a cell scrambling code set selection unit for selecting the reference cell scrambling code or one additional cell scrambling code among the generated cell scrambling codes; and
   a transmission unit for masking the selected cell scrambling code in the pilot channel, and transmitting the pilot channel.

9. The apparatus of claim 8, wherein the second scrambling codes each form at least one code group and the cell scrambling codes exist in each of the code groups, and the number of cell scrambling codes is equal to the number of combinations of the first scrambling codes and the second scrambling codes.

10. The apparatus of claim 8, wherein the cell scrambling code generator comprises a first generator for generating the reference cell scrambling code and a second generator for generating the additional cell scrambling codes.

11. An apparatus for receiving a pilot signal in a wireless communication system, the apparatus comprising:
   a reception unit for receiving a first synchronization channel signal, a second synchronization channel signal and a pilot channel signal;
   a synchronization signal decision unit for acquiring a plurality of first scrambling codes applied to the first synchronization channel and a plurality of second scrambling codes applied to the second synchronization channel from the first synchronization channel signal and the second synchronization channel signal, respectively;
   a cell scrambling code generator for generating, as a reference cell scrambling code, one of a plurality of cell scrambling codes mapped to each combination of one of the plurality of first scrambling codes and one of the plurality of second scrambling codes, and generating, as additional cell scrambling codes, the remaining cell scrambling codes except for the reference cell scrambling code; and a pilot decision unit for masking the generated reference cell scrambling code or one of the additional cell scrambling codes to the pilot channel signal, to determine whether the pilot channel signal has been successfully received.

12. The apparatus of claim 11, wherein the second scrambling codes each form at least one code group and the cell scrambling codes exist in each of the code groups, and the number of cell scrambling codes is equal to the number of combinations of the first scrambling codes and the second scrambling codes.

13. The apparatus of claim 11, wherein the cell scrambling code generator comprises a first generator for generating the reference cell scrambling code and a second generator for generating the additional cell scrambling codes.

14. The apparatus of claim 11, wherein the cell scrambling code generator sequentially generates the additional cell scrambling codes under control of the pilot decision unit after generating the reference cell scrambling code.

15. The apparatus of claim 14, wherein the pilot decision unit masks the reference cell scrambling code with the pilot channel signal to determine whether the pilot channel signal has been successfully received, and when the pilot channel signal has not been successfully received, sequentially masks the additional cell scrambling codes with the pilot channel signal to determine whether the pilot channel signal has been successfully received.

* * * * *